US012310406B2

(12) United States Patent
Duc

(10) Patent No.: US 12,310,406 B2
(45) Date of Patent: May 27, 2025

(54) VAPORISER ASSEMBLY FOR AN AEROSOL-GENERATING SYSTEM

(71) Applicant: Altria Client Services LLC, Richmond, VA (US)

(72) Inventor: Fabien Duc, Neuchatel (CH)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 0 days.

(21) Appl. No.: 18/468,935

(22) Filed: Sep. 18, 2023

(65) Prior Publication Data

US 2024/0080942 A1 Mar. 7, 2024

Related U.S. Application Data

(63) Continuation of application No. 16/952,689, filed on Nov. 19, 2020, now Pat. No. 11,778,696, which is a (Continued)

(30) Foreign Application Priority Data

Jun. 20, 2016 (EP) .................................... 16175307

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/42* (2020.01); *A24F 40/48* (2020.01); *A24F 40/485* (2020.01);
(Continued)

(58) Field of Classification Search
None
See application file for complete search history.

(56) References Cited

U.S. PATENT DOCUMENTS 4,947,875 A * 8/1990 Brooks ................ A61M 15/00 131/194
5,894,841 A * 4/1999 Voges .................. A61M 11/001 128/200.14
(Continued)

FOREIGN PATENT DOCUMENTS

CN 1788806 A 6/2006
CN 101610805 A 12/2009
(Continued)

OTHER PUBLICATIONS

Extended European Search Report Application No. 16175307.4-1656 dated Jan. 9, 2017.
(Continued)

*Primary Examiner* — Thor S Campbell
(74) *Attorney, Agent, or Firm* — Harness Dickey & Pierce. P.L.C.

(57) ABSTRACT

A vaporizer assembly includes a tube having a first end with an inlet opening and a second end with an outlet opening. The vaporizer assembly also includes a heater element configured to vaporize liquid aerosol-forming substrate. The heater element is at the second end of the tube. The first end of the tube is fluidly connectable with a liquid storage portion. When the first end of the tube is fluidly connected with the liquid storage portion, the liquid aerosol-forming substrate can flow from the liquid storage portion through the inlet opening into the tube. The outlet opening of the tube includes perforations having a width ranging from about 1 micrometer to about 500 micrometers.

20 Claims, 4 Drawing Sheets

Related U.S. Application Data continuation of application No. 15/623,825, filed on Jun. 15, 2017, now Pat. No. 10,881,140, which is a continuation of application No. PCT/EP2017/062297, filed on May 22, 2017.

(51) Int. Cl.

| | |
|---|---|
| ***A24F 40/42*** | (2020.01) |
| ***A24F 40/48*** | (2020.01) |
| ***A24F 40/485*** | (2020.01) |
| ***H05B 1/02*** | (2006.01) |
| *A24F 40/70* | (2020.01) |

(52) U.S. Cl.

CPC ............ *H05B 1/0227* (2013.01); *A24F 40/10* (2020.01); *A24F 40/70* (2020.01)

(56) References Cited

U.S. PATENT DOCUMENTS

| | | | | | |
|---|---|---|---|---|---|
| 6,062,212 | A * | 5/2000 | Davison | B05B 17/0646 | 128/200.14 |
| 6,516,796 | B1 * | 2/2003 | Cox | A61M 15/008 | 128/200.23 |
| 7,066,398 | B2 * | 6/2006 | Borland | C25D 1/10 | 239/102.2 |
| 8,201,554 | B2 * | 6/2012 | Reinhold | A61M 11/042 | 128/200.14 |
| 8,590,744 | B2 | 11/2013 | Orr | | |
| 10,085,485 | B2 * | 10/2018 | Hunt | B65D 25/38 | |
| 10,272,170 | B2 * | 4/2019 | Dubief | A24F 40/485 | |
| 10,881,140 | B2 * | 1/2021 | Duc | A24F 40/485 | |
| 2003/0056790 | A1 * | 3/2003 | Nichols | A61M 15/025 | 128/203.16 |
| 2003/0072717 | A1 * | 4/2003 | Reinhold | A61M 15/025 | 128/200.23 |
| 2003/0075188 | A1 * | 4/2003 | Adiga | A24F 42/10 | 131/185 |
| 2003/0108342 | A1 * | 6/2003 | Sherwood | B05B 17/04 | 392/397 |
| 2003/0173219 | A1 * | 9/2003 | Davies | A61M 15/00 | 204/600 |
| 2005/0045179 | A1 * | 3/2005 | Faison | A61M 11/042 | 128/203.12 |
| 2005/0235991 | A1 * | 10/2005 | Nichols | A61M 11/042 | 128/204.17 |
| 2007/0107879 | A1 | 5/2007 | Radomski et al. | | |
| 2007/0262478 | A1 * | 11/2007 | Price | A61M 15/0021 | 261/78.1 |
| 2008/0156326 | A1 * | 7/2008 | Belcastro | B05B 1/24 | 128/203.12 |
| 2014/0305454 | A1 * | 10/2014 | Rinker | A24F 40/46 | 131/329 |
| 2015/0090256 | A1 | 4/2015 | Chung | | |
| 2016/0120221 | A1 * | 5/2016 | Mironov | A24F 40/42 | 392/395 |
| 2016/0138795 | A1 * | 5/2016 | Meinhart | G06F 30/20 | 392/395 |
| 2016/0271347 | A1 * | 9/2016 | Raichman | A24F 40/05 | |
| 2018/0104214 | A1 * | 4/2018 | Raichman | A61P 11/06 | |
| 2018/0146709 | A1 * | 5/2018 | Bessant | A24F 40/40 | |
| 2018/0255834 | A1 * | 9/2018 | Dillmann | A24B 15/167 | |
| 2019/0183177 | A1 * | 6/2019 | Hubbard | A61M 15/06 | |

FOREIGN PATENT DOCUMENTS

| | | | |
|---|---|---|---|
| CN | 102655773 | A | 9/2012 |
| CN | 104125783 | A | 10/2014 |
| CN | 104223362 | A | 12/2014 |
| DE | 202015008626 | U1 | 3/2016 |
| JP | H08-511966 | A | 12/1996 |
| JP | H11-033097 | A | 2/1999 |
| JP | 2009-525113 | A | 7/2009 |
| KR | 10-1996-0703326 | A | 8/1996 |
| KR | 10-2008-0090502 | A | 10/2008 |
| RU | 2425608 | C2 | 8/2011 |
| WO | WO-2015/117702 | A1 | 8/2015 |
| WO | WO-2015/149403 | A1 | 10/2015 |

OTHER PUBLICATIONS

International Search Report dated Aug. 23, 2017 in International Application No. PCT/EP2017/062297.

Written Opinion dated Aug. 23, 2017 in International Application No. PCT/EP2017/062297.

Russian Office Action and Search Report for corresponding Application No. 2018145300, dated Jul. 17, 2020.

Written Opinion for corresponding Application No. PCT/EP2017/062297, dated May 16, 2018.

Russian Notice of Allowance dated Oct. 28, 2020 for corresponding Russian Application No. 2018145300, and English-language translation thereof.

Chinese Office Action dated Jan. 25, 2021 for corresponding Chinese Application No. 201780032677.5, and English-language translation thereof.

Japanese Office Action dated Jun. 10, 2021 for corresponding Japanese Application No. 2018-566942, and English-language translation thereof.

Japanese Notice of Allowance dated Jan. 4, 2022 for corresponding Japanese Application No. 2018-566942, and English-language translation thereof.

Korean Office Action dated Jun. 9, 2022 for corresponding Korean Application No. 10-2018-7033149, and English-language translation thereof.

Notice of Allowance dated Dec. 22, 2022 issued in related Korean patent application No. 10-2018-7033149.

* cited by examiner

VAPORISER ASSEMBLY FOR AN AEROSOL-GENERATING SYSTEM

CROSS REFERENCE TO RELATED APPLICATIONS

This application is a continuation of U.S. application Ser. No. 16/952,689, filed on Nov. 19, 2020, which is a continuation of U.S. application Ser. No. 15/623,825, filed on Jun. 15, 2017, which is a continuation of, and claims priority to, international application no. PCT/EP2017/062297, filed on May 22, 2017, and further claims priority under 35 U.S.C. § 119 to European Patent Application No. 16175307.4, filed Jun. 20, 2016, the entire contents of each of which are incorporated herein by reference.

BACKGROUND

Field

Example embodiments relate to a vaporiser assembly for an aerosol-generating system and an aerosol-generating system with the vaporiser assembly.

Description of Related Art

Handheld electrically operated aerosol-generating systems may include a battery and control electronics and a separate cartridge comprising a supply of liquid aerosol-forming substrate held in a liquid storage portion and an electrically operated vaporiser or heater element. The liquid storage portion may comprise capillary material, which is in contact with the heater element and ensures that the liquid is conveyed to the heater element, thereby allowing the creation of vapor. The vapor subsequently cools to form an aerosol.

For example in WO 2015/117702 A1, the entire contents of which is incorporated herein by reference thereto, the capillary material and the heater element may be provided, together with the liquid storage portion, in the cartridge. The cartridge may be provided as a single-use cartridge, which is disposed once the liquid aerosol-forming substrate held in the liquid storage portion is depleted. The capillary material and the heater element are therefore disposed together with the cartridge and new capillary material and a new heater element are required for each new cartridge.

SUMMARY

At least one example embodiment relates to a vaporiser assembly for an aerosol-generating system.

In at least one example embodiment, a vaporiser assembly for an aerosol-generating system includes a tube having a first end with an inlet opening and a second end with an outlet opening, and a heater element configured to vaporize liquid aerosol-forming substrate. The heater element is at the second end of the tube. The first end of the tube is configured to be fluidly connectable with a liquid storage portion such that when the liquid storage portion is connected with the first end of the tube, the liquid aerosol-forming substrate flows from the liquid storage portion through the inlet opening into the tube. The outlet opening of the tube is in the form of perforations having a width ranging from about 1 micrometer to about 500 micrometers.

In at least one example embodiment, the tube is made of at least one of a glass and a ceramic.

In at least one example embodiment, the heater element includes at least one of a coil wrapped around the second end of the tube and a metallic thin film on a surface of the tube at the second end of the tube.

In at least one example embodiment, the heater element includes at least one of a metallic thin film and an electric wire, and the heater element is encapsulated in the glass tube.

In at least one example embodiment, the vaporiser assembly further comprises a pump. The pump includes at least one of a micro-pump system and a mechanical pump syringe system. The pump is configured to control the flow of the liquid aerosol-forming substrate from the liquid storage portion into the tube.

In at least one example embodiment, the liquid aerosol-forming substrate in the tube is pressurized.

In at least one example embodiment, the tube includes a hydrophobic layer on the second end of the tube.

In at least one example embodiment, the hydrophobic layer is on inner surfaces of the perforations.

In at least one example embodiment, the hydrophobic layer is on an upper half of a height of the inner surfaces of the perforations.

In at least one example embodiment, the tube is made of a conductive material, and the second end of the tube forms the heater element.

At least one example embodiment relates to an aerosol-generating system.

In at least one example embodiment, an aerosol-generating system, comprises a power supply, electric circuitry configured to control the power supply, a vaporiser assembly including, a tube having a first end with an inlet opening and a second end with an outlet opening, and a heater element configured to vaporize liquid aerosol-forming substrate. The heater element is at the second end of the tube. The first end of the tube is configured to be fluidly connectable with a liquid storage portion such that when the liquid storage portion is connected with the first end of the tube, the liquid aerosol-forming substrate flows from the liquid storage portion through the inlet opening into the tube. The outlet opening of the tube is in the form of perforations having a width ranging from about 1 micrometer to about 500 micrometers. The aerosol-generating system also includes a replaceable liquid storage portion fluidly connectable with the first end of the tube. The first end of the tube is insertable into the liquid storage portion, such that the tube comes into fluid communication with the liquid aerosol-forming substrate stored in the liquid storage portion.

In at least one example embodiment, the replaceable liquid storage portion includes a sealing membrane configured to seal an outer circumference of the tube, when the tube in inserted into the liquid storage portion.

In at least one example embodiment, the replaceable liquid storage portion includes a sealing foil beneath the sealing membrane. The sealing foil is configured to be removed before the first end of the tube is inserted into the replaceable liquid storage portion.

In at least one example embodiment, the liquid storage portion further comprises: a collapsible bag configured to contain the liquid aerosol-forming substrate. The collapsible bag is configured to pressurize the liquid aerosol-forming substrate in the liquid storage portion.

At least one example embodiment relates to a process for manufacturing a vaporiser assembly.

In at least one example embodiment, a process for manufacturing a vaporiser assembly for an aerosol-generating system includes i) providing a tube having a first end with an inlet opening and a second end with an outlet opening, the first end of the tube configured to be fluidly connectable with a liquid storage portion such that, when the liquid storage portion is connected with the first end of the tube, a liquid aerosol-forming substrate can flow from the liquid storage portion through the inlet opening into the tube; ii) placing a heater element at the second end of the tube; and iii) establishing the outlet opening of the tube as perforations having a width ranging from about 1 micrometer to about 500 micrometers.

BRIEF DESCRIPTION OF THE DRAWINGS

Features described in relation to one example embodiment may equally be applied to other example embodiments.

Example embodiments will now be described with reference to the accompanying drawings.

DETAILED DESCRIPTION

Figure 1:
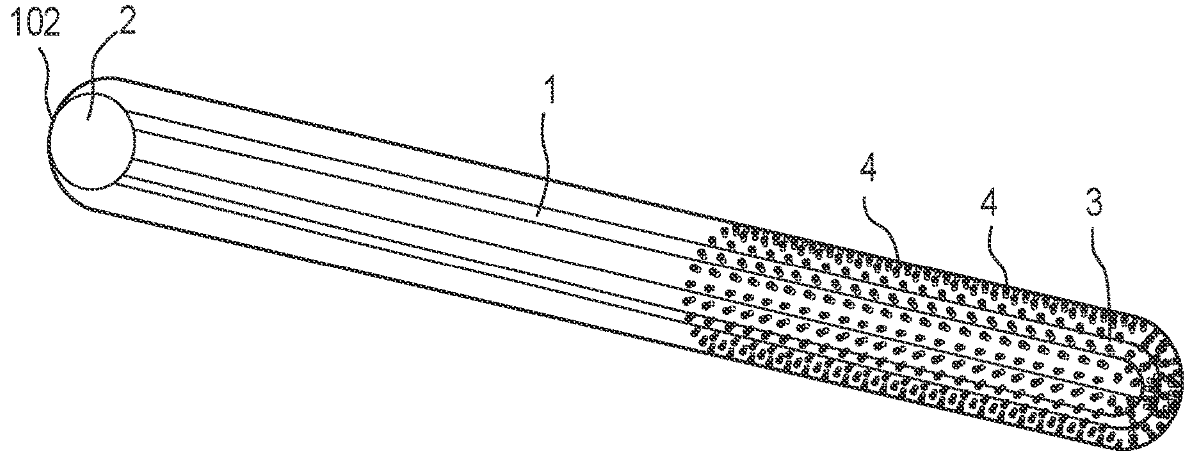
FIG. 1 is an illustration of a vaporiser assembly according to at least one example embodiment.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following description, illustrative embodiments may be described with reference to acts and symbolic representations of operations (e.g., in the form of flow charts, flow diagrams, data flow diagrams, structure diagrams, block diagrams, etc.) that may be implemented as program modules or functional processes including routines, programs, objects, components, data structures, etc., that perform particular tasks or implement particular abstract data types. The operations be implemented using existing hardware in existing electronic systems, such as one or more microprocessors, Central Processing Units (CPUs), digital signal processors (DSPs), application-specific-integrated-circuits (ASICs), SoCs, field programmable gate arrays (FPGAs), computers, or the like.

Further, one or more example embodiments may be (or include) hardware, firmware, hardware executing software, or any combination thereof. Such hardware may include one or more microprocessors, CPUs, SoCs, DSPs, ASICs, FPGAs, computers, or the like, configured as special purpose machines to perform the functions described herein as well as any other well-known functions of these elements. In at least some cases, CPUs, SoCs, DSPs, ASICs and FPGAs may generally be referred to as processing circuits, processors and/or microprocessors.

Although processes may be described with regard to sequential operations, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

At least one example embodiment relates to a vaporiser assembly for an aerosol-generating system. The vaporiser assembly comprises a tube with a first end with an inlet opening and a second end with an outlet opening. The vaporizer assembly further comprises a heater element configured to vaporize liquid aerosol-forming substrate. The heater element is at the second end of the tube. The first end of the tube is configured to be fluidly connectable with a liquid storage portion such that a liquid aerosol-forming substrate can flow from the liquid storage portion through the inlet opening into the tube, when the liquid storage portion is connected with the first end of the tube. The outlet opening of the tube is provided as perforations having a width of between 1 micrometer and 500 micrometer.

The tube may substantially prevent and/or reduce leakage of the liquid aerosol-forming substrate out of the outlet opening of the tube, when a liquid storage portion is fluidly connected with the first end of the tube. When the liquid storage portion is fluidly connected with the first end of the tube, the liquid aerosol-forming substrate may flow from the liquid storage portion through the inlet opening into the tube, but may not leak out of the outlet opening of the tube. In at least one example embodiment, the perforations, which are the outlet opening of the tube, allow vapour to pass out of the tube. Vaporized liquid aerosol-forming substrate may flow out of the outlet opening of the tube via the perforations at the second end of the tube, while the aerosol-forming substrate in liquid form does flow out of these perforations.

The tube may have an essentially tube shaped body. The first end of the tube is open. The tube may have any suitable cross-section such as a round, circular, angular, triangular, rectangular or elliptical profile. The tube may have a diameter such that liquid aerosol-forming substrate is drawn from the liquid storage portion into the tube in the direction of the second end of the tube by capillary action. Thus, liquid aerosol-forming substrate may be conveyed from the liquid storage portion to the perforations by capillary action.

The open end at the first end of the tube is configured as the inlet opening. The second end of the tube may be formed like the closed end portion of a test tube. However, the perforations are provided in the second end of the tube such that an outlet opening is formed at the second end of the tube. The second end of the tube may also be configured as an open end. The perforations may be provided on side surfaces of the tube near the second end of the tube. A retaining material such as a porous capillary material may be in the second end of the tube to substantially prevent and/or reduce leakage.

The vaporizer assembly, comprising the tube and the heater element, may be re-usable. A replaceable liquid storage portion may be connected with the first end of the tube of the vaporizer assembly, wherein the liquid storage portion comprises liquid aerosol-forming substrate. The liquid aerosol-forming substrate may flow from the liquid storage portion through the inlet opening into the tube of the vaporizer assembly. The liquid aerosol-forming substrate may be subsequently vaporized by the heater element at the second end of the tube. The vaporized aerosol-forming substrate may flow through the perforations at the second end of the tube to form an aerosol.

Due to the vaporizer assembly being re-useable, the liquid storage portion may be detached from the vaporizer assembly once the liquid aerosol-forming substrate in the liquid storage portion is depleted. After that, a new liquid storage portion may be attached to the vaporizer assembly. The costs of the consumable, i.e. the liquid storage portion, may be decreased, since the liquid storage portions do not have to contain an independent capillary material or heater element.

The size of the perforations, i.e. the width of the perforations ranges from about 1 micrometer to about 500 micrometers, from about 5 micrometers to about 250 micrometers, or from about 10 micrometers to about 150 micrometer. The liquid aerosol-forming substrate may be substantially prevented from flowing through the perforations, while vaporized liquid aerosol-forming substrate may flow through the perforations. The width of the perforations may range from about 15 micrometers to about 80 micrometers, from about 20 micrometers to about 60 micrometers, or may be about 40 micrometers.

The perforations may generally be dimensioned such that the liquid aerosol-forming substrate cannot flow through the perforations, and vaporized liquid aerosol-forming substrate, generated by the heater element, can flow through the perforations.

Depending upon the characteristics of the liquid aerosol-forming substrate, such as a viscosity of the liquid aerosol-forming substrate, and depending upon a pressure difference between the liquid aerosol-forming substrate within the tube and the ambient pressure outside of the vaporizer assembly, the width of the perforations is may be varied. If liquid aerosol-forming substrates with different viscosities are to chosen for the same vaporizer assembly, the dimensions of the perforations are chosen such that with an estimated maximum pressure difference and an estimated lowest estimated viscosity of the liquid aerosol-forming substrates, no liquid aerosol-forming substrate leaks out through the perforations at the second end of the tube.

Whether a liquid, for example a liquid aerosol-forming substrate, may pass through perforations with the above defined width at the second end of the tube depends upon the pressure of the liquid. If a pressure difference is present between the liquid inside the tube and the outside of the tube, the liquid may flow through the perforations at the second end of the tube. In other words, if the liquid inside the tube is pressurized, the liquid may flow out of the tube depending on the pressure. The pressure threshold which must be applied to the liquid before the liquid flows through the perforations may be described with a “hydrostatic head”. A “hydrostatic head” or “hydro head” indicates this pressure threshold above which the liquid penetrates through the perforations of the tube. The higher the hydrostatic head, the higher is the pressure which must be applied onto the liquid before liquid leaks through the perforations. The hydrostatic head also depends on the viscosity of the liquid aerosol-forming substrate. The liquid aerosol-forming substrate may have a viscosity in the range of from about 15 millipascal seconds to about 200 millipascal seconds or from about 18 millipascal seconds to about 81 millipascal seconds. The liquid aerosol-forming substrate may be pressurized well below hydrostatic head.

A low hydrostatic head means that less pressure must be applied to the liquid aerosol-forming substrate inside of the tube before the liquid flows through the perforations at the second end of the tube. The hydrostatic head of the perforated second end of the tube may be below about 100 millimeters, below about 50 millimeters, or below about 10 millimeters. Such a low hydrostatic head substantially prevents and/or reduces liquid from flowing through the tube at the second end of the tube when a low pressure is applied to the liquid, while the amount of vapour which can flow through the perforations per time is high. A high hydrostatic head substantially prevents and/or reduces leakage of the liquid even if a high pressure is applied to the liquid. However, only a low amount of vapour may pass through the perforations at the second end of the tube per time. Thus, the hydrostatic head of the perforated second end of the tube may be configured to obtain the desired (or, alternatively predetermined) delivery performance depending on the type of liquid aerosol-forming substrate.

When the first end of the tube is fluidly connected with the liquid storage portion, the fluid inside of the liquid storage portion may be pressurized such that the liquid flows into the tube. The pressure may be below about 0.5 bar, below about 0.3 bar, or below about 0.1 bar. These pressure values are applied to the liquid aerosol-forming substrate additional to the ambient pressure of about 1 bar. In total, the liquid aerosol-forming substrate is pressurized with a total pressure of below about 1.5 bar, below about 1.3 bar, or below about 1.1 bar.

The pressure, which is applied to the liquid aerosol-forming substrate in the liquid storage portion may be applied in the direction of the tube, when the first end of the tube is fluidly connected with the liquid storage portion. Thus, the liquid aerosol-forming substrate flows into the tube through the inlet opening regardless of the spatial orientation of the tube. In other words, regardless of the spatial orientation of the vaporizer assembly, the tube is filled with the liquid aerosol-forming substrate as long as liquid aerosol-forming substrate is present in the liquid storage portion.

To facilitate the flow of liquid aerosol-forming substrate into the tube through the inlet opening by applying a pressure to the liquid aerosol-forming substrate, the vaporizer assembly may comprise a pump. The pump may be micro-pump system or a mechanical pump syringe system. In at least one example embodiment, the pump may be any suitable type of pump system if the pump system is small enough to fit in the vaporizer assembly and/or in the tube. The pump system may be provided near or within the inlet opening of the tube such that the pump system may pump the liquid aerosol-forming substrate from the liquid storage portion into the tube through the inlet opening, when the first end of the tube is fluidly connected to the liquid storage portion.

In at least one example embodiment, the liquid storage portion include a collapsible bag. The liquid aerosol-forming substrate is within the collapsible bag. The collapsible bag is within the liquid storage portion. When the first end of the tube is fluidly connected with the liquid storage portion, the first end of the tube is fluidly connected with the inner of the collapsible bag through the inlet opening. The collapsible bag exerts a pressure upon the liquid aerosol-forming substrate in the direction of the tube until the liquid aerosol-forming substrate within the collapsible bag is depleted.

The tube is provided with the liquid aerosol-forming substrate from the liquid storage portion until the liquid aerosol-forming substrate is depleted. Thus, liquid aerosol-forming substrate is provided directly adjacent to the perforations at the second end of the tube.

In order to reduce and/or substantially prevent leakage of the liquid aerosol-forming substrate out of the tube at the second end of the tube, and at the same time enable a large amount of vapor to flow out of the tube per time, a hydrophobic layer may alternatively or additionally be provided at the second end of the tube. The hydrophobic layer may be provided on the inner surfaces of the perforations, facing the liquid aerosol-forming substrate, such that droplets of the liquid aerosol-forming substrate may not flow out of the perforations. The hydrophobic layer may only be on the inner surfaces of the perforations to achieve this effect. Also, the hydrophobic layer may be provided on an upper half of a height (“half height”) of the inner surfaces of the perforations. This half height is seen from the outside of the tube. By coating half of the height of the inner surfaces of the perforations, droplets of the liquid aerosol-forming substrate may enter the perforations but not flow entirely through the perforations. Thus, the vaporization of the liquid through the heater element is enhanced, since the distance between the liquid aerosol-forming substrate and the heater element is decreased.

The heater element is at the second end of the tube. As described above, the width of the perforations at the second end of the tube is chosen such that vaporized aerosol-forming substrate, vaporized by the heater element, may flow out of the tube through the perforations at the second end of the tube. The heater element may be provided directly on the second end of the tube so that the heater element directly contacts the second end of the tube. Alternatively, the heater element may be provided in the close proximity of the second end of the tube. Also, the heater element may be provided at the circumference of the tube adjacent to the second end of the tube. In any case, the heater element is configured to heat the second end of the tube.

The heater element may be an electric resistance heater. The heater element may comprise an electrically conductive material such as a metallic material. The heater element may comprise copper or aluminium. The electrically conductive material may be heated by an electric current flowing through the electrically conductive material.

The heater element may be a coil wrapped around the second end of the tube. In at least one example embodiment, the heater element may be a metallic coating or thin film, which may be on a surface of the tube at the second end of the tube. The thin film may extend into the perforations, such that the thin film is on an upper half of the height of the inner surfaces of the perforations as described above with reference to the hydrophobic layer. The heater element may vaporize liquid aerosol-forming substrate directly within the perforations. Thus, the electric power needed to operate the heater element may be decreased. The heater element may be an electric conductor such as an electric wire. The heater element may also be within the material of the tube such that the tube encapsulates the heater element. In the latter case, only contact portions of the heater element are not encapsulated by the tube. The contact portions may be distanced from the perforations such that liquid aerosol-forming substrate do not contact the contact portions.

In at least one example embodiment, the tube may form the heater element configured to vaporize the liquid aerosol-forming substrate. The tube may be at least partly made of a conductive material such as aluminium or copper so that this part of the tube acts as an electrical resistance heater. The conductive material is at the second end of the tube such that liquid aerosol-forming substrate can be vaporised at the second end of the tube.

The tube may be made of any suitable material. The tube may be made of glass or ceramic. The tube may comprise multiple materials, wherein one of these materials is glass or ceramic. The tube may be entirely made of glass or ceramic. Glass and ceramic have increased heat resistance.

The tube may be easily cleaned. Also, glass and ceramic are very stable materials, which do not degrade with temperature. The vaporizer assembly may therefore be activated multiple times before the vaporizer assembly must be replaced.

In at least one example embodiment, the heater element may comprise glass material. In this regard, the heater element may comprise a glass substrate wherein the electrically conductive material may be applied onto the glass substrate as a thin film. Also, the electrically conductive material may be encapsulated in the glass substrate. When the tube comprises glass, the electrically conductive material of the heater element is encapsulated in the glass of the tube or is included as a thin film on a surface of the glass tube.

At least one example embodiment relates to an aerosol-generating system. The aerosol-generating system comprises a power supply and electric circuitry configured to control the power supply. The aerosol-generating system further comprises a vaporizer assembly as described above. A replaceable liquid storage portion can be fluidly connected with the first end of the tube. As described above, liquid aerosol-forming substrate in the liquid storage portion can flow in the tube of the vaporizer assembly, being subsequently vaporized by the heater element at the second end of the tube. Thus, an aerosol is generated. A mouth piece may also be included. A flow sensor may be provided to detect a draw on the mouth piece of the aerosol-generating system.

The liquid storage portion may include a sealing membrane configured to seal the outer circumference of the tube, when the tube is inserted into the liquid storage portion. The sealing membrane may be ruptured during insertion of the tube into the liquid storage portion, wherein the rest of the sealing membrane encloses the outer circumference of the tube due to the flexible nature of the sealing membrane. The liquid aerosol-forming substrate may only flow from the liquid storage portion into the tube.

A sealing foil may be included on the liquid storage portion such that the liquid aerosol-forming substrate may not flow out of the liquid storage portion before the first end of the tube is fluidly connected with the liquid storage portion. The sealing foil is on top of the sealing membrane such that the sealing membrane is not harmed before the liquid storage portion is fluidly connected with the first end of the tube. Before the liquid storage portion is connected with the first end of the tube, the sealing foil is removed such that the sealing membrane faces the first end of the tube.

At least one example embodiment relates to a process for manufacturing a vaporizer assembly for an aerosol-generating system is provided. The process comprises providing a tube having a first end with an inlet opening and a second end with an outlet opening, wherein the first end of the tube is configured to be fluidly connectable with a liquid storage portion such that, when the liquid storage portion is connected with the first end of the tube, a liquid aerosol-forming substrate can flow from the liquid storage portion through the inlet opening into the tube, ii) providing a heater element for vaporizing the liquid aerosol-forming substrate, wherein the heater element is provided at the second end of the tube, and iii) providing the outlet opening of the tube as perforations having a width ranging from about 1 micrometer to about 500 micrometers.

FIG. 1 is an illustration of a tube 1 of a vaporizer assembly according to at least one example embodiment.

In at least one example embodiment, as shown in FIG. 1, the tube 1 is made of glass.

The tube has a first end 2 and a second end 3. The first end 2 of the tube 1 comprises an open inlet opening 102 such that a liquid aerosol-forming substrate may flow into the tube 1. The second end 3 of the tube 1 is closed except for an outlet opening 4. The outlet opening 4 includes perforations 4. The perforations 4 each have a width of about 40 micrometers. Thus, the liquid aerosol-forming substrate does not leak out of the tube 1 at the second end 3 of the tube 1.

Figure 2:
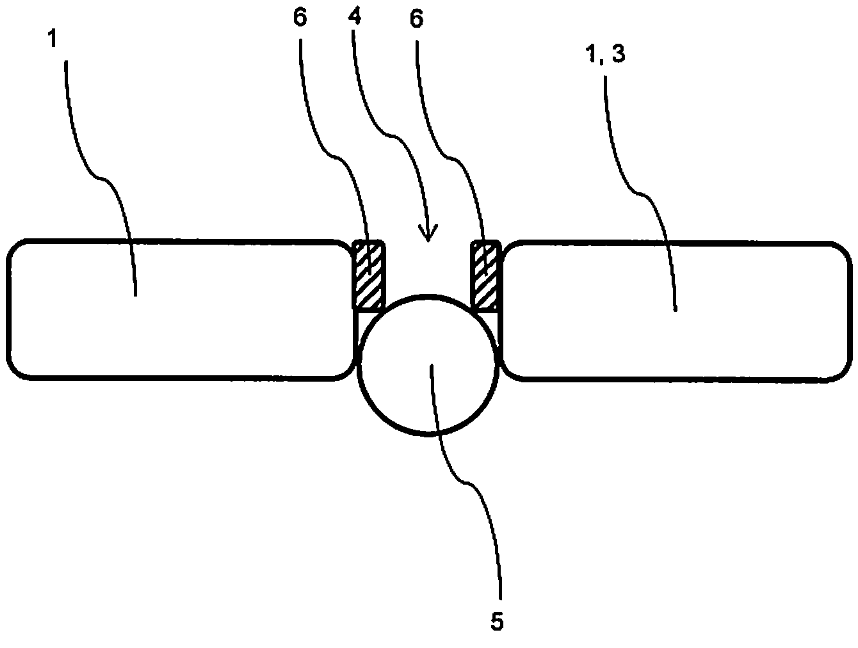
FIG. 2 is a sectional view of a perforation of the tube of the vaporiser assembly according to at least one example embodiment.

FIG. 2 is a cross-sectional view of a single perforation 4 in the area of the second end 3 of the tube 1. A droplet 5 of liquid aerosol-forming substrate is depicted in FIG. 2, wherein the droplet 5 of the liquid aerosol-forming substrate cannot flow through the perforation 4. In FIG. 2, a hydrophobic layer 6 is shown to substantially prevent the droplet 5 from flowing through the perforation 4. The width of the perforation 4 is smaller than the diameter of the droplet 5 such that the droplet 5 cannot flow through the perforation 4.

Figures 3A, 3B, 3C:
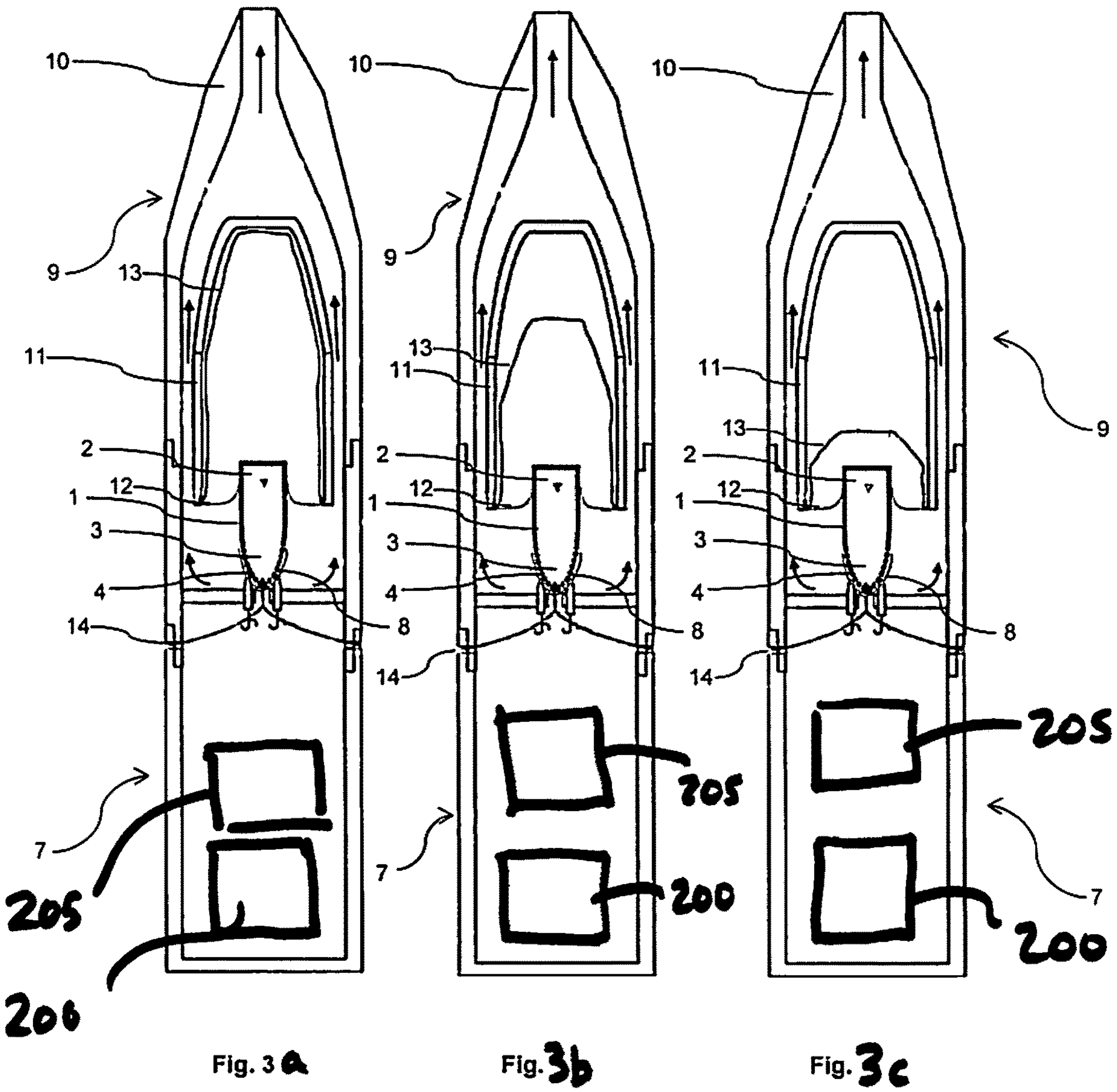
FIGS. 3*a*, 3*b*, and 3*c* are cross-sectional views of an aerosol-generating system according to at least one example embodiment.

FIGS. 3*a*, 3*b*, and 3*c* are illustrations of an aerosol-generating system according to at least one example embodiment.

In at least one example embodiment, as shown in FIGS. 3*a*, 3*b*, and 3*c*, the tube 1 is described above with reference to FIGS. 1 and 2. The tube 1 is part of a main body 7 of the aerosol-generating system. The main body 7 comprises control circuitry 200 and a power supply 205 configured to supply a heater element 8 of the vaporizer assembly with electric energy. The heater element 8 is on a surface at the second end 3 of the tube 1. The heater element 8 is formed as a thin film, which is applied onto the surface of the tube 1. The heater element 8 comprises contact portions, which are electrically connectable to the power supply. The heater element 8 is formed such that vapor may pass through the perforations 4 and the heater element 8 at the second end 3 of the tube 1. The heater element 8 is configured to heat and vaporize liquid aerosol-forming substrate near the second end 3 of the tube 1.

FIGS. 3*a*, 3*b*, and 3*c* further show a cartridge 9, comprising a mouthpiece 10 and a liquid storage portion 11. The cartridge 9 may be a disposable cartridge, wherein the cartridge 9 is disposed once liquid aerosol-forming substrate within the liquid storage portion 11 is depleted. Also, the liquid storage portion 11 can be a disposable consumable, wherein the liquid storage portion 11 is renewed and inserted into the cartridge once the liquid aerosol-forming substrate within the cartridge 11 is depleted.

FIGS. 3*a*, 3*b*, and 3*c* also illustrate a sealing membrane 12, which is at an end of the liquid storage portion 11 facing the tube 1 of the vaporizer assembly. When the liquid storage portion 11 is fluidly connected with the tube 1 of the vaporizer assembly, the sealing membrane 12 is ruptured and enables that liquid aerosol-forming substrate flows from the liquid storage portion into the tube 1. Before the liquid storage portion 11 is fluidly connected with the tube 1, the sealing membrane 12 reduces and/or substantially prevents the liquid aerosol-forming substrate from flowing out of the liquid storage portion 11.

FIGS. 3*a*, 3*b*, and 3*c* also illustrate a collapsible bag 13, within the liquid storage portion 11. The collapsible bag 13 contains the liquid aerosol-forming substrate. The collapsible bag 13 as shown in FIGS. 3*a*, 3*b*, and 3*c* is configured to pressurize the liquid aerosol-forming substrate within the collapsible bag 13 such that the liquid aerosol-forming substrate is conveyed into the tube 1 through the inlet opening 102 and to the second end 3 of the tube 1. Thus, the liquid aerosol-forming substrate is in the tube 1. As shown in subsequent FIGS. 3*b* and 3*c*, as the liquid aerosol-forming substrate is depleted, the collapsible bag 13 shrinks in the direction of the tube 1. Thus, the collapsible bag 13 allows that all the liquid aerosol-forming substrate is depleted regardless of the spatial orientation of the aerosol-generating system.

During vaporizing of the aerosol-generating system, the liquid aerosol-forming substrate is vaporized by the heater element 8. In this regard, ambient air is drawn through air inlets 14 towards the heater element 8 (indicated by arrows). Vaporized aerosol-forming substrate is mixed with the ambient air next to the heater element 8 to form an aerosol. The aerosol is subsequently drawn towards the mouth piece 10 (indicated by arrows). The aerosol cools while being drawn towards the mouthpiece 10 such that an aerosol with aerosol droplets of desired (or, alternatively predetermined) size is created.

Figure 4:
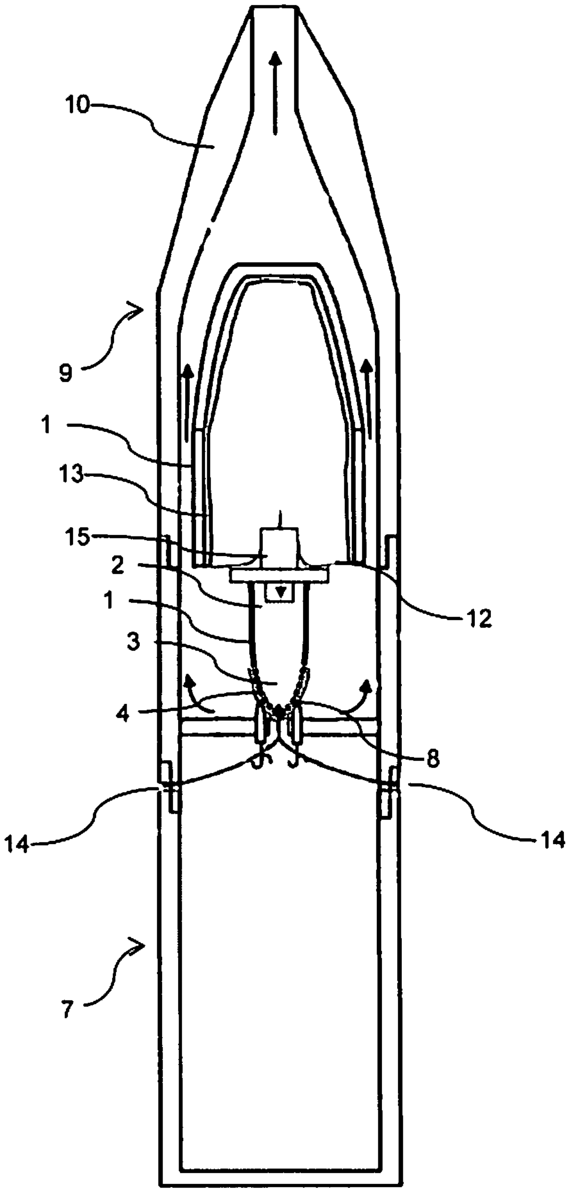
FIG. 4 is a sectional view of a tube in an aerosol-generating system according to at least one example embodiment.

In at least one example embodiment, as shown in FIG. 4, the collapsible bag 13 is functionally replaced by a pump system 15.

The pump system 15 is provided at the first end 2 of the tube 1 such that the liquid aerosol-forming substrate is pumped from the inside of the liquid storage portion 13 into the tube 1. The aerosol-generating system is—besides the pump system, structurally identical to the aerosol-generating system as described above. In FIG. 4, the collapsible bag 13 is also shown. Thus, the collapsible bag 13 can—together with the pump system 15—facilitate conveyance of the liquid aerosol-forming substrate from the inside of the liquid storage portion 11 into the tube 1. In at least one example embodiment, the pump system 15 can be used alone to convey the aerosol-forming substrate from the inside of the liquid storage portion 11 into the tube 1.

The exemplary embodiments described above illustrate but are not limiting. In view of the above discussed exemplary embodiments, other embodiments consistent with the above exemplary embodiments will now be apparent to one of ordinary skill in the art.

I claim:

1. A vaporiser assembly for an aerosol-generating system, comprising:

a tube having a first end including an inlet opening and a second end including an outlet opening; and a heater element configured to vaporize a liquid aerosol-forming substrate, the heater element at the second end of the tube, the first end of the tube being configured to be fluidly connectable with a liquid storage portion such that the liquid aerosol-forming substrate flows from the liquid storage portion through the inlet opening into the tube from the inlet at the first end to the outlet opening at the second end, the outlet opening of the tube including perforations, the perforations dimensioned such that liquid aerosol-forming substrate cannot flow through the perforations.

2. The vaporiser assembly of claim 1, wherein the tube comprises a glass, a ceramic, or both a glass and a ceramic.

3. The vaporiser assembly of claim 2, wherein the heater element includes a metallic thin film, an electric wire, or both a metallic thin film and an electric wire.

4. The vaporiser assembly of claim 1, wherein the heater element includes a coil wrapped around the second end of the tube, a metallic thin film on a surface of the tube at the second end of the tube, or both a coil wrapped around the second end of the tube and a metallic thin film on a surface of the tube at the second end of the tube.

5. The vaporiser assembly of claim 1, further comprising:

a pump including a micro-pump system or a mechanical pump syringe system, the pump configured to control flow of the liquid aerosol-forming substrate from the liquid storage portion into the tube.

6. The vaporiser assembly of claim 5, wherein the liquid aerosol-forming substrate in the tube is pressurized.

7. The vaporiser assembly of claim 1, wherein the tube includes a hydrophobic layer at the second end of the tube.

8. The vaporiser assembly of claim 7, wherein the hydrophobic layer is on inner surfaces of perforations.

9. The vaporiser assembly of claim 7, wherein the hydrophobic layer is on an upper half of a height of inner surfaces of the perforations.

10. The vaporiser assembly of claim 1, wherein the tube is made of a conductive material, and the second end of the tube forms the heater element.

11. An aerosol-generating system, comprising:

a power supply;

electric circuitry configured to control the power supply;

a vaporiser assembly including;

a tube having a first end including an inlet opening and a second end including an outlet opening, and a heater element configured to vaporize liquid aerosol-forming substrate, the heater element at the second end of the tube, the first end of the tube being configured to be fluidly connectable with a liquid storage portion such that the liquid aerosol-forming substrate flows from the liquid storage portion through the inlet opening into the tube from the inlet at the first end to the outlet opening at the second end, the outlet opening of the tube including perforations, the perforations dimensioned such that liquid aerosol-forming substrate cannot flow through the perforations; and a replaceable liquid storage portion fluidly connectable with the first end of the tube.

12. The aerosol-generating system of claim 11, wherein the tube comprises a glass, a ceramic, or both a glass and a ceramic.

13. The aerosol-generating system of claim 12, wherein the heater element comprises a metallic thin film, an electric wire, or both a metallic thin film and an electric wire.

14. The aerosol-generating system of claim 11, wherein the heater element includes a coil wrapped around the second end of the tube, a metallic thin film on a surface of the tube at the second end of the tube, or both a coil wrapped around the second end of the tube and a metallic thin film on a surface of the tube at the second end of the tube.

15. The aerosol-generating system of claim 11, further comprising:

a pump including a micro-pump system or a mechanical pump syringe system, the pump configured to control flow of the liquid aerosol-forming substrate from the liquid storage portion into the tube.

16. The aerosol-generating system to claim 11, wherein the tube is made of a conductive material, and the second end of the tube forms the heater element.

17. The aerosol-generating system of claim 11, wherein the replaceable liquid storage portion includes a sealing membrane configured to seal an outer circumference of the tube when the tube in inserted into the liquid storage portion.

18. The aerosol-generating system of claim 17, wherein the replaceable liquid storage portion includes a sealing foil beneath the sealing membrane, the sealing foil being configured to be removed before the first end of the tube is inserted into the replaceable liquid storage portion.

19. The aerosol-generating system of claim 11, wherein the liquid storage portion further comprises:

a collapsible bag configured to contain the liquid aerosol-forming substrate, the collapsible bag configured to pressurize the liquid aerosol-forming substrate in the liquid storage portion.

20. A method for manufacturing a vaporiser assembly for an aerosol-generating system, the method comprising:

providing a tube having a first end with an inlet opening and a second end with an outlet opening, the first end of the tube configured to be fluidly connectable with a liquid storage portion such that a liquid aerosol-forming substrate flows from the liquid storage portion through the inlet opening into the tube from the inlet at the first end to the outlet opening at the second end, the outlet opening of the tube including perforations;

placing a heater element at the second end of the tube; and establishing the outlet opening of the tube as perforations, the perforations dimensioned such that liquid aerosol-forming substrate cannot flow through the perforations.

* * * * *